United States Patent [19]
Arashi et al.

[11] 4,101,290
[45] Jul. 18, 1978

[54] CATALYTIC REACTION APPARATUS

[75] Inventors: Norio Arashi; Yukio Hishinuma; Tadayoshi Murakami, all of Hitachi, Japan

[73] Assignees: Hitachi, Ltd.; Babcock-Hitachi Kabushiki Kaisha, both of Japan

[21] Appl. No.: 669,701

[22] Filed: Mar. 23, 1976

[30] Foreign Application Priority Data
Apr. 9, 1975 [JP] Japan .................................. 50-42278

[51] Int. Cl.² ........................... B01J 8/02; B01J 8/04; F01N 3/15
[52] U.S. Cl. ............................... 23/288 R; 23/288 E; 23/288 FB
[58] Field of Search ............. 23/288 F, 288 R, 288 E, 23/288 FB, 289; 60/299

[56] References Cited
U.S. PATENT DOCUMENTS

| 2,776,875 | 1/1957 | Houdry | 23/288 F |
| 2,795,488 | 6/1957 | Reitzel et al. | 23/288 F |
| 3,041,149 | 6/1962 | Houdry | 23/288 F |
| 3,113,000 | 12/1963 | Gerhold | 23/288 F |
| 3,380,810 | 4/1968 | Hamblin | 23/288 F |
| 3,649,213 | 3/1972 | DePalma et al. | 23/288 F |
| 3,649,215 | 3/1972 | Perga et al. | 23/288 F |

Primary Examiner—Morris O. Wolk
Assistant Examiner—Bradley Garris
Attorney, Agent, or Firm—Craig & Antonelli

[57] ABSTRACT

A catalytic reaction apparatus for carrying out a gaseous reaction of a mixture of a gas to be treated, and a gaseous substance with which it reacts at an accelerated rate of reaction, which comprises a catalyst packed bed provided in a vertical plane at a predetermined angle of turning from the flow direction of the gaseous mixture in the catalytic reaction apparatus. Deviation of flow of the gaseous mixture can be effectively prevented by the present arrangement of the catalyst packed bed.

8 Claims, 8 Drawing Figures

CATALYTIC REACTION APPARATUS

The present invention relates to a catalytic reaction apparatus for carrying out a gaseous reaction of a mixture of a gas to be treated, and a gaseous substance to with which it reacts at an accelerated rate of reaction, which comprises a catalyst packed bed provided in a vertical plane at a predetermined angle of turning from the flow direction of the gaseous mixture in the catalytic reaction apparatus, thereby preventing deviation of flow of the gaseous mixture passing through the catalyst packed bed.

Catalytic reaction apparatuses have been proposed for carrying out a gaseous reaction of a mixture of a gas to be treated and a gaseous substance to react with at an accelerated rate of reaction by passing the gaseous mixture through the catalytic reaction apparatuses. One example of the catalytic reaction apparatus is the one used for removing nitrogen oxides from a flue gas by dry catalytic reduction process. In the removal of the nitrogen oxides from the flue gas by a dry catalytic reduction process, an ammonia gas, which serves as, the gaseous substance to react with, as defined herein, is injected into a combustion flue gas from a boiler, or the like, that is, the gas to be treated, as defined herein, and the resulting gaseous mixture is passed through a catalyst packed bed of the catalytic reaction apparatus, whereby, for example, NO is decomposed to $N_2$ and $H_2O$ by reaction with the ammonia. The removal of the nitrogen oxides is carried out in this manner.

The catalytic reactor apparatuses are usually in such a structure that a gaseous mixture is made to flow in a horizontal direction through the apparatuses to pass across a wall-like catalyst packed bed provided in a vertical plane therein.

According to the structures so far proposed, the catalyst packed bed is arranged in a vertical plan perpendicular or in parallel to the flow direction of a gaseous mixture. However, in the arrangement perpendicular to the flow direction of the gaseous mixture, the cross-sectional area of a flue gas duct, in which the catalyst packed bed is to be provided, must be enlarged in accordance with the flow rate of the gaseous mixture to be treated, and thus the flue gas duct must be accordingly larger at the inlet of the catalyst packed bed than at the flue gas inlet duct. That is, the largest portion of the gaseous mixture is liable to proceed directly toward the catalyst packed bed, taking the nearest distance, and only a small portion of the gaseous mixture diffuses along the enlarged side and advances toward the extended parts of the catalyst packed bed. That is, deviation of flow of the gaseous mixture takes place. In other words, the largest portion of the gaseous mixture passes across one part of the catalyst packed bed, whereas less portion through other parts. Thus, a flow direction rectifier of large size must be provided to prevent such deviation of flow of the gaseous mixture.

On the other hand, the arrangement in parallel to the gas flow is indeed effective for reducing the space of the catalyst packed bed, but in that arrangement, the end of the flue gas duct must be closed and the gaseous mixture is made to impinge against the closed end of the flue gas duct, and turn to the side direction of the flue gas duct to effectively pass the gaseous mixture across the catalyst packed bed. Thus, an appreciable pressure difference develops between the upstream side (that is, near the inlet flue gas duct side) and the downstream side (that is, near the outlet flue gas duct side of the catalyst packed bed), and accordingly the flow rate of the gaseous mixture passing across the upstream side part of the catalyst packed bed is liable to be lower than that of the downstream side part. That is, deviation of flow of the gaseous mixture develops between the upstream side and the downstream side of the catalyst packed bed arranged in parallel to the flow direction of the gaseous mixture, resulting in an ineffective re tion being carried out.

Once the deviation of flow of the gaseous mixture develops, the gaseous mixture passing across the catalyst packed bed becomes unbalanced. That is, the reaction proceeds effectively only in some part of the catalyst packed bed, but not in other parts. This phenomenon is not desirable. In the catalytic reaction apparatus, it is especially desirable to effectively carry out the reaction in the catalyst packed bed, and thus it is very necessary to prevent any occurrence of such deviation of flow of the gaseous mixture.

An object of the present invention is to provide a catalytic reaction apparatus wherein a deviation of the flow of the gaseous mixture does not occur.

The present invention provides a catalytic reaction apparatus for carrying out a gaseous reaction of a mixture of a gas to be treated, and a gaseous substance with which it reacts at an accelerated rate of reaction, which comprises a catalyst packed bed provided in a vertical plane at a predetermined angle of turning from the flow direction of the gaseous mixture in the catalytic reaction apparatus.

One embodiment of the present invention is a combination of two catalyst packed beds provided in a vertical plane, each being turned from the flow direction of the gaseous mixture to form an approximate V-shaped cross-section. By providing the catalyst packed bed in a vertical plane at a predetermined angle of turning from the flow direction of the gaseous mixture, the gaseous mixture can pass across the catalyst packed bed uniformly both at the upstream side and the downstream side of the catalyst packed bed, thereby preventing any deviation of the flow of the gaseous mixture.

Now, the present invention will be described in detail, referring to the accompanying drawings.

Figure 1:
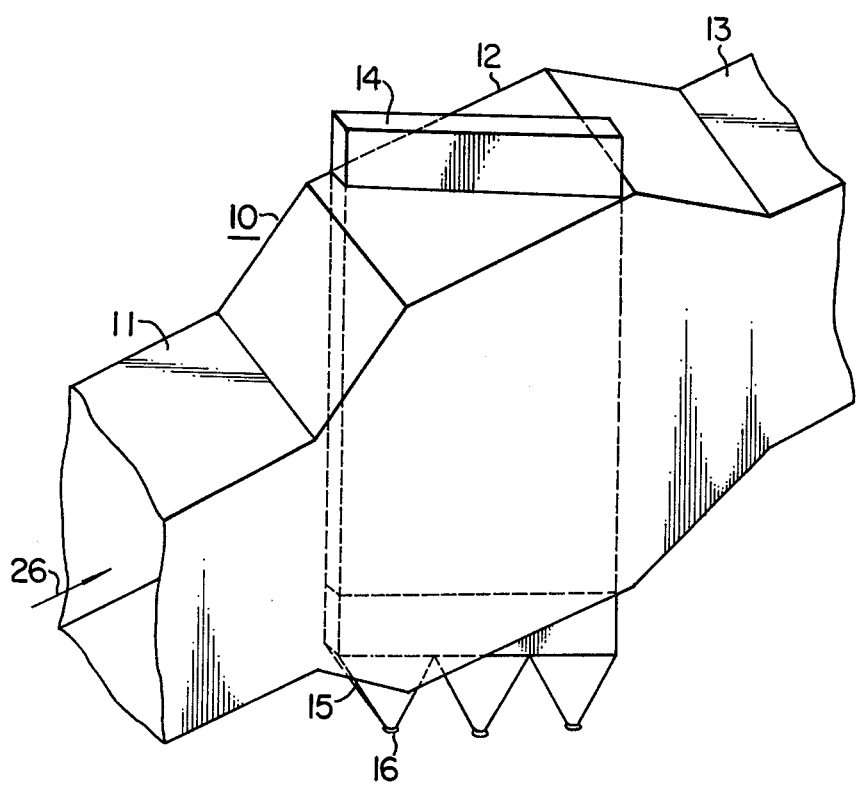
FIG. 1 is a schematical view of a catalytic reaction apparatus of one embodiment of the present invention.

In FIG. 1, a catalytic reaction apparatus 10 is comprised of an inlet flue gas duct 11 for introducing a gaseous mixture to be treated, an intermediate flue gas duct 12 having a larger cross-sectional area than that of the inlet flue gas duct 11, wherein a catalyst packed bed 14 is provided in a vertical plane for treating the gaseous mixture introduced, and an outlet flue gas duct 13 having a cross-sectional area almost equal to that of the inlet flue gas duct 11, and being directed to discharging the treated gaseous mixture. The catalyst packed bed 14, in which catalysts are filled, is in a wall-like structure and provided vertically in the intermediate flue gas duct 12. Hoppers 15 with discharge outlets 16 for withdrawing the catalysts from the bed are provided at the bottom of the catalyst packed bed 14.

According to the embodiment of FIG. 1, the catalyst packed bed 14 is fixed in the intermediate flue gas duct 12 at a predetermined degree of turning from the flow direction 26 of the gaseous mixture. That is, the catalyst packed bed 14 is so arranged that one side or end of the bed may be positioned near the inlet flue gas duct 11, that is, at the left side in FIG. 1, whereas the other side or end of the bed may be positioned near the outlet flue gas duct 12, that is, at the right side in FIG. 1, and that the catalyst packed bed may cross the intermediate flue gas duct 12 at a predetermined angle of turning from the flow direction of the gaseous mixture.

According to the structure of the present invention embodied in FIG. 1, the gaseous mixture to be treated is introduced into the intermediate flue gas duct 12 from the inlet flue gas duct 11, and passed across the catalyst packed bed 14. Since the catalyst packed bed 14 is fixed at a predetermined angle of turning from the flow direction 26 of the gaseous mixture, the gaseous mixture can pass slowly across the catalyst packed bed 14 before a pressure difference develops between the inlet flue gas duct side and the outlet flue gas duct side. That is, the gaseous mixture can pass almost uniformly across both inlet flue gas duct side and outlet flue gas duct side, and no deviation of flow of the gaseous mixture takes place. The catalyst packed bed 14 can be fixed in a position reversed to that of FIG. 1 with the same effect.

Figure 2:
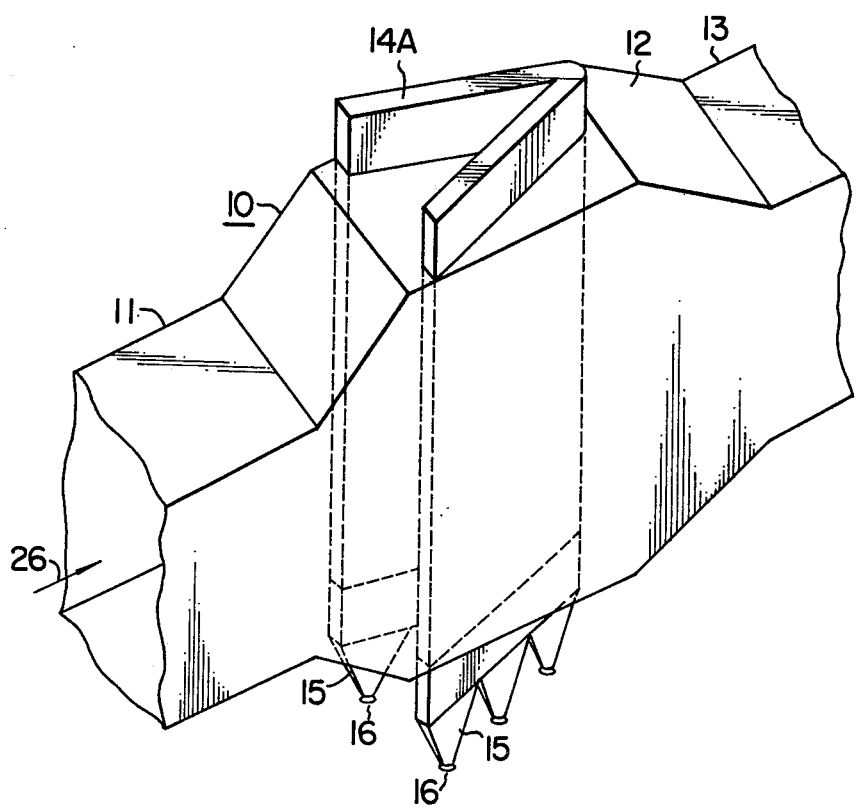
FIG. 2 is a schematical view of a catalytic reaction apparatus of another embodiment of the present invention.

In FIG. 2, a wall-like catalyst packed layer 14A in an approximate V shape is vertically provided in a catalytic reaction apparatus 10 by directing the open end of the bed toward an inlet flue gas duct 11. Each side of the V-shaped bed is positioned at a predetermined angle of turning from the flow direction 26 of a gaseous mixture. In FIG. 2, one approximately V-shaped catalyst packed bed is provided, but two catalyst packed beds can be provided in parallel to make a W shape arrangement, or a nearly U-shaped catalyst packed bed can be also provided. That is, a catalyst packed bed of any shape can be used in the present invention as the bed 14A, so long as the bed has a part positioned at a predetermined angle of turning from the flow direction of the gaseous mixture. At both inlet end and outlet end of the catalyst packed bed 14A are provided almost horizontally an inlet flue gas duct 11 and an outlet flue gas duct 13 so as to pass the gaseous mixture to be treated to pass almost horizontally across the catalyst packed bed. The open end of the approximately V-shaped catalyst packed bed is directed against the flow direction of the gaseous mixture, and the catalyst packed bed has hoppers 15 with outlets 16 at its bottom for withdrawing the catalysts from the bed.

A gaseous mixture to be treated, for example, a combustion flue gas containing nitrogen oxides, is led to the catalytic reaction apparatus 10 through the inlet flue gas duct 11 in the flow direction 26 of the gaseous mixture, and brought into contact with the catalysts of the catalyst packed bed 14A, whereby the nitrogen oxides are reduced or decomposed, and removed, and discharged through the outlet flue gas duct 13. Since the catalyst packed bed 14A is in an approximately V-shaped structure, the gaseous mixture can pass almost uniformly across both inlet flue gas duct side and outlet flue gas duct side, and no deviation of flow of the gaseous mixture develops. Especially, the open end of the bed is directed against the gas flow, and consequently the gaseous mixture can readily enter and pass uniformly across the entire bed.

Usually, the combustion flue gas contains dusts, and the dusts are deposited and accumulated on the surfaces of the catalysts, increasing a flow resistance of the bed. Thus, the catalysts must be withdrawn from the hoppers 14 appropriately, and after the elimination of the deposited dusts from the catalysts, the catalysts are refilled in the bed to prevent any increase in pressure drop in the catalyst packed bed.

Figure 3A:
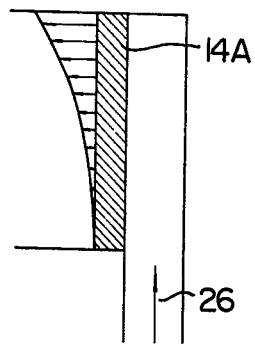
FIG. 3a is a diagram showing a conventional gas flow rate distribution, and FIG. 3b a diagram showing a gas flow rate distribution of the present invention.
Figure 3B:
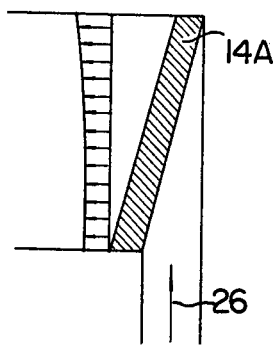

FIGS. 3a and 3b schematically show that the present invention is very effective, as compared with the conventional art, on the basis of test results of clarifying states of deviation of flow of the gaseous mixture. In FIG. 3a, a catalyst packed bed 14A is provided in parallel to the flow direction 26 of a gaseous mixture, as seen in the conventional art (the arrangement perpendicular to the flow direction of the gaseous mixture is not shown). In FIG. 3b, the catalyst packed bed 14A is provided at a predetermined angle $\theta$ of turning from the flow direction of the gaseous mixture according to the present invention. As is apparent from FIGS. 3a and 3b, it is an effective means for preventing an occurrence of deviation of flow to provide the catalyst packed bed at a predetermined angle of turning from the flow direction of the gaseous mixture.

Figure 4:
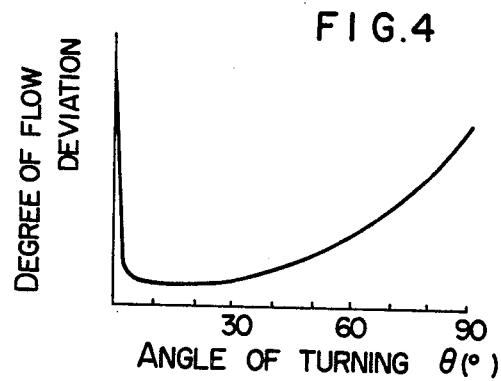
FIG. 4 is a diagram showing relations between the angle of turning of the catalyst packed bed from the flow direction of a gaseous mixture and the degree of flow deviation.

In FIG. 4, relations between the angle of turning of the catalyst packed bed 14A from the flow direction of a gaseous mixture are shown. As is apparent from FIG. 4, an influence of gas momentum is appreciable at an angle of turning of the catalyst packed bed of less than 5°, and thus the deviation of flow is considerable. On the other hand, at an angle of turning or more than 30°, an influence of enlargement at the inlet to the catalyst packed bed from the inlet flue gas duct becomes gradually larger, and thus the deviation of flow develops again. It is seen from the foregoing results that the preferable angle of turning of the catalyst packed bed for minimum occurrence of deviation of flow is in a range of 5° to 30°. Even if the angle of turning exceeds 30°, but if it is near 30°, the occurrence of deviation of flow can be more prevented than in the conventional art.

Figure 5:
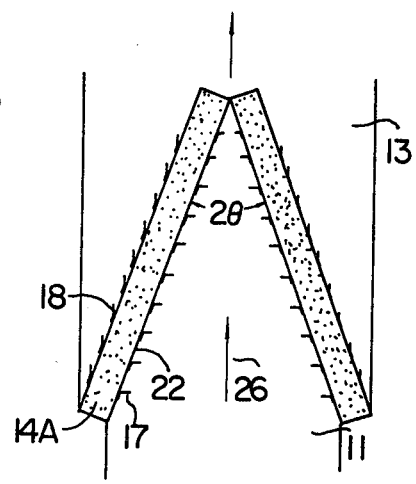
FIG. 5 is a cross-sectional view of a catalyst packed bed of another embodiment of the present invention.
Figure 6:
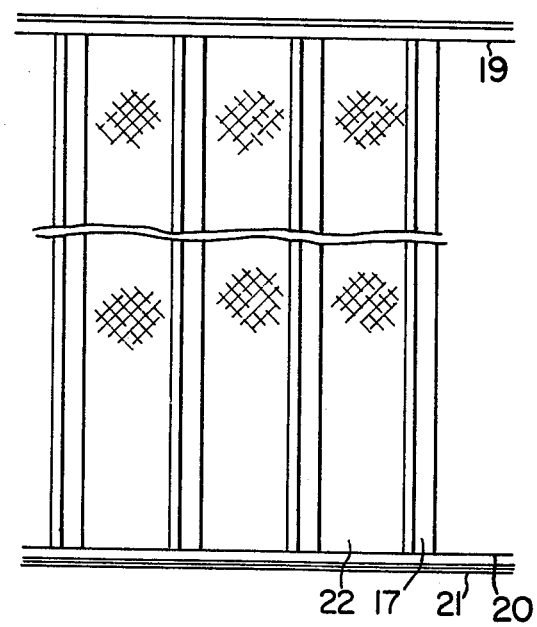
FIG. 6 is a side view of the catalyst packed bed of FIG. 5.
Figure 7:
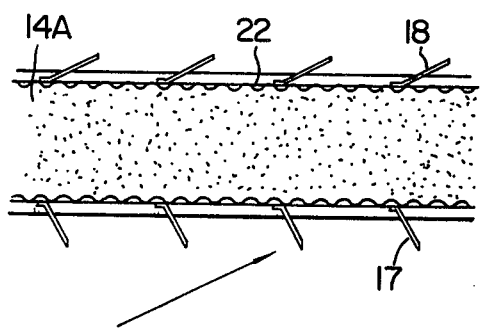
FIG. 7 is an enlarged part in detail of the catalyst packed bed of FIG. 5.

In FIGS. 5 to 7, another embodiment of the present invention is shown, where a catalyst packed bed must be arranged at an angle of turning outside said range, owing to difficulty in fabrication or reduced space for the installation of the catalyst packed bed.

If the angle of turning of the catalyst packed bed is outside the range of 5° to 30°, appreciable deviation of flow takes place, as described above, and thus inlet flow-rectifying guide plates 17 and outlet flow-rectifying guide plates 18 are provided at inlet end and outlet end of the catalyst packed bed 14A, respectively. The catalyst packed bed 14A is fixed to a fitting 21 of catalytic reaction apparatus body by upper end fixing fittings 19 of the bed and lower end fixing fittings 20 of the bed, and wire nets 22 for supporting the catalysts are provided between the upper end fixing fittings 19 and the lower end fixing fittings 20. The catalyst packed bed is thus constructed with the catalysts filled between the wire nets 22. Thus, by fixing the inlet flow-rectifying guide plates 17 and the outlet flow-rectifying guide plates 18 to the wire nets 22, these guide plates can be made to act simultaneously as reinforcing members for preventing an expansion of the wire nets 22 due to the weight of the catalysts.

As described above, a catalyst packed bed filled with catalysts is provided in a vertical plane at a predetermined angle of turning from the flow direction of a gaseous mixture to be treated in the present catalytic reaction apparatus, and thus the gaseous mixture can pass across the catalyst packed bed before any pressure difference develops between the inlet flue gas duct side and the outlet flue gas duct side of the catalyst packed bed, and thus can flow almost uniformly across the bed. That is, the catalytic reaction can be carried out effectively while preventing any deviation of the flow of the gaseous mixture from occurring.

What is claimed is:

1. A catalytic reaction apparatus for removing a component from a gas by providing a catalyst-packed bed filled with catalysts therein in the gas, and making the gas pass through the catalyst-packed bed, which comprises the catalyst-packed bed being extended in a vertical direction with respect to gas flow and wherein said catalyst packed bed comprises wall surfaces extended in said vertical direction formed from flat plates, said wall surfaces forming an approximately V-shaped structure, with the open end of the approximately V-shaped structure facing an upstream side of the gas flow, wherein said approximately V-shaped structure is provided with a plurality of flow-rectifying guide plates having an equal length from wall surfaces of the catalyst-packed bed, wherein the flow-rectifying guide plates facing the upstream side of the gas flow are arranged perpendicularly to the general flow of gas through said apparatus and those facing the downstream side of the gas flow are arranged substantially in parallel to the gas flow.

2. A catalytic reaction apparatus for removing a component from a gas comprising:
a housing defining an inner chamber having inlet means for receiving a gas from which a component is to be removed and outlet means from which said gas is discharged after removal of said component, and
at least one catalyst packed bed disposed in said chamber between said inlet and outlet means, said catalyst packed bed being formed of a plurality of plates, said plates defining a V-shaped structure having an open end making a line of contact across each sidewall of a first set of oppositely facing sidewalls of said chamber, said plates sloping from said open end toward said outlet means to a closed end of said structure located in an area of said chamber between the sidewalls of said first set, said V-shaped structure between said open and closed ends extending at least to a second set of oppositely facing sidewalls of said chamber, said second set of oppositely facing sidewalls extending transversely with respect to and between the sidewalls of said first set of oppositely facing sidewalls, and wherein said V-shaped structure includes means for exchanging catalysts contained in said catalyst packed bed comprising a portion of said V-shaped structure extending through and beyond said housing, said portion of said V-shaped bed being provided with outlet means.

3. A catalytic reaction device according to claim 2, wherein said outlet means is formed of a plurality of hoppers with outlets.

4. A catalytic reaction apparatus for removing a component from a gas comprising:
a housing defining an inner chamber having inlet means for receiving a gas from which a component is to be removed and outlet means from which said gas is discharged after removal of said component, and
at least one catalyst packed bed disposed in said chamber between said inlet and outlet means, said catalyst packed bed being formed of a plurality of plates, said plates defining a V-shaped structure having an open end making a line of contact across each sidewall of a first set of oppositely facing sidewalls of said chamber, said plates sloping from said open end toward said outlet means to a closed end of said structure located in an area of said chamber between the sidewalls of said first set, said V-shaped structure between said open and closed ends extending at least to a second set of oppositely facing sidewalls of said chamber, said second set of oppositely facing sidewalls extending transversely with respect to and between the sidewalls of said first set of oppositely facing sidewalls, and wherein said V-shaped structure extends through and beyond said second set of oppositely facing sidewalls.

5. A catalytic reaction apparatus according to claim 4, wherein said plates form an angle of turning with respect to the sidewalls of said first set of between 5°–30°.

6. A catalytic reaction apparatus according to claim 4, wherein a portion of said V-shaped structure which extends through and beyond said second set of sidewalls has hoppers with outlets for withdrawing catalysts from the bed.

7. A catalytic reaction apparatus for removing a component from a gas comprising:
a housing defining an inner chamber having inlet means for receiving a gas from which a component is to be removed and outlet means from which said gas is discharged after removal of said component, and
at least one catalyst packed bed disposed in said chamber between said inlet and outlet means, said catalyst packed bed being formed of a plurality of plates, said plates defining a V-shaped structure having an open end making a line of contact across each sidewall of a first set of oppositely facing sidewalls of said chamber, said plates sloping from said open end toward said outlet means to a closed end of said structure located in an area of said chamber between the sidewalls of said first set, said V-shaped structure between said open and closed ends extending at least to a second set of oppositely facing sidewalls of said chamber, said second set of oppositely facing sidewalls extending transversely with respect to and between the sidewalls of said first set of oppositely facing sidewalls, wherein each of said plates form an angle, with respect to the sidewalls of said first set of other than 5°–30°, and said plates are formed of wire nets which are provided with a plurality of flow rectifying guide plates of equal length affixed thereto at a plurality of non-adjacent locations andsaid flow rectifying guide plates extending outwardly from said wire nets in a non-perpendicular orientation with respect to said wire nets.

8. A catalytic reaction apparatus for removing a component from a gas comprising:

a housing defining an inner chamber having inlet means for receiving a gas from which a component is to be removed and outlet means from which said gas is discharged after removal of said component, and at least one catalyst packed bed disposed in said chamber between said inlet and outlet means, said catalyst packed bed being formed of a plurality of plates, said plates defining a V-shaped structure having an open end making a line of contact across each sidewall of a first set of oppositely facing sidewalls of said chamber, said plates sloping from said open end toward said outlet means to a closed end of said structure located in an area of said chamber between the sidewalls of said first set, said V-shaped structure between said open and closed ends extending at least to a second set of oppositely facing sidewalls of said chamber, said second set of oppositely facing sidewalls extending transversely with respect to between the sidewalls of said first set of oppositely facing sidewalls, wherein each of said plates form an angle with respect to the sidewalls of said first set of other than 5°–30°, and said plates are provided with a plurality of flow rectifying guide plates of equal length and wherein the flow rectifying guide plates which are positioned on the side of said V-shaped structure directed towards said inlet means extend in a direction perpendicular to the flow of gas and the flow rectifying guide plates which are positioned on the side of said V-shaped structure directed toward said outlet means extend in a direction parallel to the flow of gas.

* * * * *